Nov. 27, 1951          E. H. VOELKER          2,576,734

ACCESS DOOR AND METHOD OF MAKING AND MOUNTING THE SAME

Filed July 29, 1949

INVENTOR.
Edward H. Voelker
BY
ATTORNEY.

Patented Nov. 27, 1951

2,576,734

UNITED STATES PATENT OFFICE 2,576,734

ACCESS DOOR AND METHOD OF MAKING AND MOUNTING THE SAME

Edward H. Voelker, Huntington Station, N. Y., assignor to Republic Aviation Corporation, Farmingdale, N. Y., a corporation of Delaware Application July 29, 1949, Serial No. 107,533

12 Claims. (Cl. 20—40)

This invention relates to access doors together with the means and manner of mounting thereof and is particularly concerned with the construction of such doors and the means by which they may be mounted as a closure for an aperture or opening in a cooperating structure, where both the door and the structure is largely fabricated of synthetic resin.

Among its other objects the instant invention proposes an access door fabricated of synthetic resin so mounted in an opening or aperture in a coacting structure, which may also be made of synthetic resin, that it can be repeatedly removed and replaced without damage to the resin of the door, or to that of the coacting structure.

Moreover, the present invention provides means by which the access door may be so mounted in conjunction with an opening in a cooperating structure that the outer surface of the door constitutes an unbroken, or substantially uninterrupted, continuation of the surface of the structure regardless of whether or not either the door or the structure is fabricated of synthetic resin.

Since the subject invention, while being of general application and use, is primarily designed for use in aircraft structures where the access door is fabricated of transparent or clear acrylic resin and acts as a closure for an opening in an aircraft component, such as a canopy, also fabricated of clear or transparent acrylic resin, and as acrylic resin is thermoplastic, it is contemplated hereby to provide a door and canopy construction capable of withstanding wide variations and changes in ambient temperature, and also the loads, pressures and stresses imposed thereon in flight.

Figure 1:
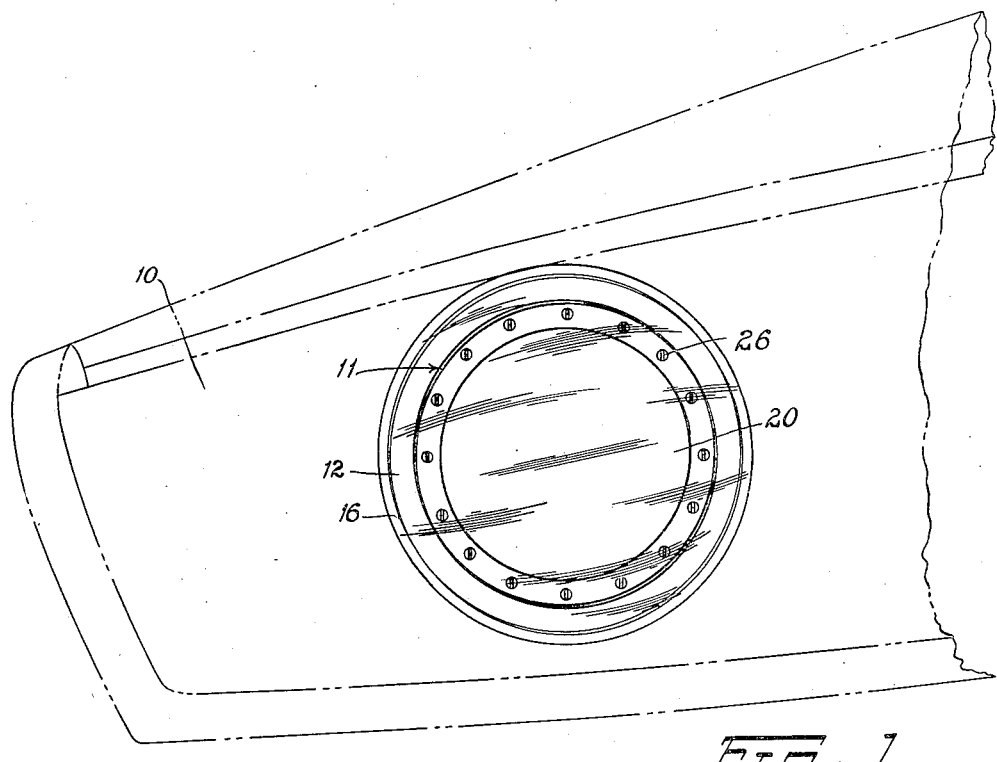
Figure 2:
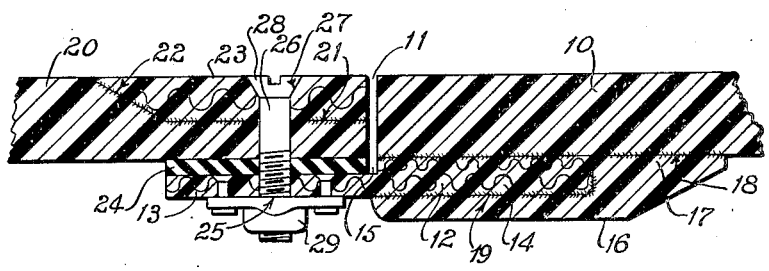

With the above and other objects in view as will be apparent this invention consists in the construction, combination and arrangement of parts all as hereinafter more fully described, claimed and illustrated in the accompanying drawing, wherein:

Fig. 1 is a perspective view of a portion of an aircraft canopy having an opening therein and an access door operating to close said opening, both the canopy and door being fabricated of transparent synthetic resin constructed and mounted in accordance with the present invention; and Fig. 2 is a fragmentary section taken through both the door and canopy as they appear in Fig. 1.

While the teachings of this invention can be applied wherever an aperture in a structural component is to be closed by a removable door or closure, it is especially useful in aircraft where structural components, such as canopies, windows, panels, etc. are fabricated of transparent acrylic resin and are pierced by an opening to be closed with a removable access door also fabricated of transparent acrylic resin, and where the aerodynamic features and characteristics of the component must be retained. Accordingly the present invention has been illustrated, and will be described, in conjunction with an aircraft canopy fabricated of transparent acrylic resin and having an access opening therein to be closed by a transparent acrylic resin access door which may be readily and repeatedly mounted in and removed from this opening in the canopy.

In military aircraft, such as fighters and pursuit airplanes, due to space limitations, it has become common practice to mount equipment on the deck of the fuselage immediately aft of the cockpit and within the space normally enclosed by the canopy regardless of its position relative to the fuselage and cockpit. Under these circumstances it has been necessary heretofore to entirely remove the canopy from the fuselage to reach and service any equipment mounted on the deck of the fuselage aft of the cockpit as aforesaid, for either the adjustment, repair or replacement thereof. Such removal of the canopy is a difficult and expensive procedure and may easily result in the marring, breaking or damaging of the canopy.

Therefore, in one of its adaptations the present invention proposes the provision of a relatively large access opening in the canopy convenient to equipment on the deck of the fuselage whatever the position of the canopy may, at the moment, happen to be, and to provide an access door or closure mounted in and removable from this access opening whenever the equipment enclosed by or under the canopy requires attention.

In addition to providing an access opening in the body of the canopy and a door for the normal closure thereof, this invention contemplates a structure, both for the door and for the edge of the resin body defining the access opening in the canopy, that will protect the resin of both canopy and door from shattering or crazing due to unbalanced forces which otherwise might be set up by the attaching or clamping means employed to secure the access door within the opening.

Furthermore, it is proposed to so mount the access door in the opening that its outer surface is flush with or forms a continuation of the outer surface of the canopy thereby eliminating any projecting parts which may develop drag or turbulence in the air stream.

Acrylic resin is especially suitable for the fabricating of transparent components of an aircraft because (1) it is lighter than glass of equivalent strength and (2) it, being thermoplastic, may be readily formed and shaped, especially where the component embodies compound curves. Though synthetic resins other than acrylic resins eventually may be substituted for the acrylic resins now commonly used in aircraft construction, the description of the instant invention will be confined to its use in conjunction with acrylic resins with the understanding however, that it may be adapted for use in conjunction with other resins having the desired characteristics and which lend themselves to the fabrication essential to the employment of this invention.

Reference being had more particularly to the drawings, 10 designates a canopy fabricated of clear or transparent acrylic resin, having an access opening 11 formed therein. This access opening 11 may have any desired shape or size, but it has been found that a generally circular opening is more satisfactory for most purposes. Since the opening 11 is provided for access through the body of the canopy 10 to equipment situated on the deck of the fuselage aft of the cockpit and housed within the canopy, it follows that this opening, in this particular adaptation of the invention, must be relatively large.

As will be hereinafter apparent the fabrication of both the access door and the coacting edge of the access opening 11 in the canopy 10 entails the assembly of several components made of synthetic resin into an integral, unitary and homogeneous construction. This assembly requires the use of a cement consisting of the resin of the structure dissolved in a volatile solvent. Where acrylic resin is employed in the fabrication of the components the cement consists of a solution of acrylic resin and a volatile solvent for such resin. Acetone has been found to be a particularly effective solvent. Since the present invention is described in conjunction with components fabricated of acrylic resin, it is to be understood that reference herein to "cement," "cementing" or "welding" means either a solution of acrylic resin and acetone (or other suitable volatile solvent), or the use of this cement in the attachment of acrylic resin components one to the other.

In the treatment of either or both of two surfaces of acrylic resin to be placed in flush or abutting contact with the aforesaid cement the solvent of the cement softens these surfaces so that the application of pressure causes an intermingling of the resins of the surfaces one with the other and also with the resin of the cement. The ultimate evaporation of the solvent of the cement leaves an integral, homogeneous mass of resin having all of the characteristics of a unitary member rather than those of a composite structure formed by the union of two originally independent components.

A supporting ring 12 is associated with the lip or edge of the access opening 11 in the canopy 10 and consists of a relatively thick base or mounting section 14 to underlie the edge portion of the canopy 10 defining the access opening, and a flange section or extension 13 to project into and circumscribe the access opening 11. Hence, this ring 12 may be said to consist of two concentric but integral sections viz., the outer mounting section 14 and the inner section or flange 13. Multiple layers of stainless steel wire cloth are laminated with and surrounded by acrylic resin in the desired cross-sectional form to create the ring 12. In its fabrication the ring 12 is built up inwardly from its outer edge or circumference approximately one-half of its width so that the base or mounting section 14 is substantially thicker than the flange 13. One surface of the flange 13 is a flush continuation of a surface of the mounting section 14 whereby a recessed seat 15 is established on the opposite face of the flange 13, said seat being limited circumferentially by the inner edge of section 14.

After the ring 12 is fabricated of acrylic resin and laminations of woven wire cloth as aforesaid, and when the resin thereof is fully cured, that surface of the section 14 opposed to the face thereof coplanar with the extension or flange 13 is treated with the cement hereinbefore described, whereupon this treated surface of the mounting section 14 is placed in flush contact against the inner surface of the canopy 10 at the lip of the access opening 11 with the edge of the base section adjoining the flange 13 in substantial alignment with the edge of the canopy defining the opening 11. A pressure is then applied inwardly to both the section 14 and canopy 10 and maintained until the solvent of the cement has entirely evaporated whereupon the mounting section 14 becomes integral with and a homogeneous part of the canopy 10. When the ring 12 is thus mounted on and integrally attached to the canopy 10 the flange or extension 13 projects into and circumscribes the opening 11 below the inner surface of the canopy a distance substantially equal to the thickness of the section 14 projecting above the surface of the flange 13.

To provide additional support and attachment for the supporting ring 12 and to insure a completely reinforced edge defining the opening 11, a clamping ring 16 overlies the mounting section 14 of the ring 12 and is provided with an integral, lateral rim 17 at its inner edge which has a relatively broad bearing surface 18 to abut the adjoining surface of the canopy 10. The depth of the rim 17 is approximately equal to the thickness of the section 14 of the ring 12 in its operative position the clamping ring 16 and its rim in combination with the canopy 10 completely houses the section 14. After the inner surface of the ring 16 and the surface 18 of its rim 17 are treated with cement, these surfaces may be brought into flush abutment respectively with the surfaces of the base or mounting section 14 and of the canopy immediately adjoining the section 14 and an inward pressure applied thereto. Thus the resin of the clamping ring 16 and its rim 17 is integrally and homogeneously united with that of the mounting section 14 of the supporting ring 12 and to the resin of the canopy 10, the union thus established having all of the characteristics of a single mass of acrylic resin rather than those of an assembled or built up structure. The effect of the foregoing construction is to provide a space 19 at the edge of the opening 11 between the clamping ring 16 and the surface of the canopy 10 and this space is completely filled by the mounting section 14 of the supporting ring 12. Not only does the section 14 of the supporting ring 12 completely fill this space 19 between the clamping ring 16 and the canopy 10, but it is integrally united with the clamping ring 12 and the canopy 10, so that throughout its width the base section 14 of the supporting ring 12 in combination with the clamping ring 16 and the canopy 10 constitutes a single, unitary body of acrylic resin locally reinforced by the wire mesh laminations imbedded in the base section 14 and in the flange 13.

When assembled as above described the flange 13 projects from the base section 14 of the ring 12 in a plane spaced from the inner surface of the canopy 10, and substantially coplanar with the integral abutment between the clamping ring 16 and said base section 14. Thus the flange 13, which is also reinforced by the same wire mesh laminations as the mounting section 14 of the ring 12, projects into the opening 11 of the canopy adjacent to its edge and provides means for the mounting and supporting of the access door as will be hereinafter more fully described.

From the arrangement above described it is apparent that the canopy 10 is provided with a relatively large access opening 11 having a flange 13 projecting into the opening at its edge from the base section 14 of the ring 12 by which it is integrally and permanently united with the clamping ring 16 and the canopy 10. The door 20 to be removably mounted in and close the access opening 11 is formed of transparent acrylic resin shaped to be readily received in the access opening 11. The size or diameter of this door 20 is slightly less than the size or diameter of the opening 11 whereby provision is made not only for expansion and contraction occasioned by atmospheric temperature changes, but also for the ready and easy removal of the door from and replacement in the opening 11. The outer surface of the door 20 adjacent its edge or periphery is cut away or recessed to create the continuous cavity or recess 21 the bottom of which is parallel to the inner face of the door 20 while its inner end wall 22 slopes upwardly and inwardly from the inner extremity or edge of the bottom to join the outer surface of the door 20.

A reinforcing ring 23 fabricated of wire mesh or woven wire cloth laminated with and surrounded by acrylic resin is mounted in and completely fills the cavity or recess 21 with its inner face and inner edge respectively in flush contact with the bottom of said recess and the inner end wall 22 thereof. This reinforcing ring 23, by completely filling the cavity 21, has its outer face in direct alignment with and forming the continuation of the outer surface of the door. After the reinforcing ring 23 has been fabricated and the resin thereof fully cured, it is fastened or secured in the cavity or recess 21. To that end its inner face and edge is previously treated with cement, and additionally the bottom and wall 22 of the cavity may, if desired, be similarly treated. With the application of the cement the inner edge and face of the reinforcing ring 23 become softened whereby an inward pressure on the ring after it is snugly seated in the cavity 21 causes an intermingling of the resin of the ring 23, the door 20 of the cement which upon the complete evaporation of the solvent of the cement results in a unitary, integral and homogeneous union between the abutting surfaces of the ring 23 and of the cavity or recess 21. In this manner the reinforcing ring 23 becomes one with the outer surface of the periphery of the door 20.

The door 20 when seated within the opening 11, rests upon the flange 13 carried by or projecting from the inner surface of the canopy 10 as aforesaid. When so positioned the outer surface of the door 20 must constitute a flush continuation of the surrounding outer surface of the canopy 10, and not project outwardly beyond this surface of the canopy. Should the inner surface of the door 20 rest directly on the flange 13 the thickness of the door must be such that its outer surface will be a continuation, as aforesaid, of the canopy surface. However, any members inserted between the inner surface of the door 20 and the flange 13 must be compensated for in the peripheral thickness of the door to the end that the exposed face of the door will be coextensive with the surrounding surface of the canopy. If found to be desirable, a gasket 24 of rubber or other resilient material may be inserted between the flange 13 and the peripheral edge portion of the door 20.

The rubber gasket 24, the edge portion of the door 20 together with the ring 23 and the flange 13 are each provided with a series of apertures 25, the apertures of these several components being registered one with the other for the reception and the passage of the screws 26. At its outer end each aperture in the reinforcing ring 23 is flared outwardly as at 27, for the reception of the head of the cooperating screw 26, whereby its head 28 is countersunk in the ring 23 with its outer surface flush with the outer surface of said ring 23 and the door 20.

Adjacent each aperture or hole in the flange 13 and resting flush against the inner face thereof is a plate nut 29 which is riveted or otherwise immovably secured in place on the flange in registration with the coacting aperture. When the door 20 is in its operative position with all of the aforesaid apertures or holes in registration, the screws 26 may be inserted in and projected through the aligned or registered apertures to be threaded into the plate nuts 29, thereby rigidly securing the door 20 to the flange 13.

All pressures or loads applied by the means of attachment (screws 26) are confined to the reinforcing ring 23 and the flange 13, each of which is internally reinforced by the imbedded layers of wire mesh, and none of these loads or pressures are transmitted to the acrylic resin either of the door 20 or of the canopy 10.

The door 20 may be removed from the opening 11 by removing the several screws 26 holding it in place thereby permitting access to the interior of the canopy 10 through the relatively large opening 11 therein. Likewise, the door may be replaced by the aligning of the several apertures in the ring 23 and the door 20 with the corresponding openings in the flange 13, whereupon the screws 26 may be reinserted and tightened. These operations may be endlessly repeated without in any way affecting, damaging or destroying either the door 20 or the canopy 10.

From the foregoing it is evident that all loads or pressures resulting from the mounting of the door 20 in the opening 11 of the canopy 10 are localized to the areas of both the door and canopy which are reinforced by layers of wire mesh and that while the wire mesh is in effect a part of the resins of both the door and the canopy, it successfully prevents the setting-up or the development of unbalanced forces or pressure in the resins of the door and canopy beyond the limits of these localized areas.

While it has been found that the treating of one of the two surfaces of the elements of the assembly in flush abutment with cement produces a satisfactory bond, it is the better practice to treat both of the abutting surfaces so that they both are rendered viscous or tacky by action thereon of the solvent of the cement. By this means any irregularities in the abutting surfaces are compensated for and a tight union or bond is created without involving the delay otherwise necessary for the cement on one surface to act upon and soften the other surface.

Through the present invention is illustrated and described in conjunction with an aircraft canopy and an access opening therein, it is manifest that it can readily be used wherever access openings and closures therefor are employed. It is equally evident that while this invention is particularly useful in structures of acrylic resins it may be applied to structures of other adaptable resins without departing from the spirit and scope hereof.

What is claimed is:

1. The combination with a body formed of acrylic resin and having an access opening therein, of a supporting ring associated with the lip of said opening consisting of a mounting section disposed in registration with the opening to overlie and be integrally united with the surface of the body adjacent said opening and a flange projecting into and circumscribing the opening, said supporting ring being a unit fabricated of woven cloth impregnated with and surrounded by acrylic resin, a door to be removably positioned within said opening and mounted on a flange of the supporting ring consisting of a plate of acrylic resin, a reinforcing ring fabricated of woven cloth impregnated with and surrounded by acrylic resin integrally embedded in one surface of the plate at the edge thereof, screws piercing the reinforcing ring and the edge portion of the door as well as the flange of the supporting ring, and nuts disposed adjacent that surface of the flange in opposition to the door for cooperation with said screws to removably secure the door to the flange of the supporting ring.

2. The combination with a body formed of acrylic resin and having an access opening therein, of a unitary supporting ring associated with the lip of said opening consisting of a relatively thick mounting section disposed in registration with the opening to overlie and be integrally united with a surface of the body adjacent said opening and a relatively thin flange projecting into and circumscribing the opening, said supporting ring being fabricated of woven wire cloth impregnated with and surrounded by acrylic resin, a clamping member of acrylic resin overlying and integrally united with the mounting section of the supporting ring and having a transverse rim at its inner edge to bear in flush contact and be integrally united with the surface of the body adjoining said supporting section, a door to be removably positioned within said opening and mounted on a flange of the supporting ring consisting of a plate of acrylic resin, a reinforcing ring fabricated of woven wire cloth impregnated with and surrounded by acrylic resin integrally embedded in one surface of the plate at the edge thereof, screws piercing the reinforcing ring and the edge portion of the door as well as the flange of the suporting ring, and nuts disposed adjacent that surface of the flange in opposition to the door for cooperation with said screws to removably secure the door to the flange of the supporting ring.

3. The combination with a body formed of acrylic resin and having an access opening therein, of a unitary supporting ring associated with the lip of said opening consisting of a mounting section disposed in registration with the opening to overlie and be integrally united with a surface of the body adjacent said opening and a flange projecting into and circumscribing said opening, said supporting ring being fabricated of woven material impregnated with and surrounded by acrylic resin, a door to be removably positioned within said opening and supported by said flange with its surfaces coextensive with the surrounding surfaces of the body consisting of a plate of acrylic resin, a reinforcing ring fabricated of woven material impregnated with and surrounded by acrylic resin integrally imbedded in the edge portion of the outer surface of the plate, and attaching means coacting with the reinforcing ring, the edge portion of the door and the flange to removably secure the door to the flange.

4. The combination with a body formed of acrylic resin and having an access opening therein, of a unitary supporting ring associated with the lip of said opening consisting of a mounting section disposed in registration with the opening to overlie and be integrally united with a surface of the body adjacent said opening and having a flange projecting into and circumscribing the opening, said supporting ring being fabricated of a woven material impregnated with and surrounded by acrylic resin, a clamping member of clear acrylic resin overlying the mounting section of the supporting ring and having a transversely disposed rim at its inner surface embracing the edge of the mounting section and in flush contact with the surface of the body adjoining said supporting section, the abutting surfaces of the clamping ring including its rim and the mounting section of the clamping ring and the surface of the body being integrally united, a door formed of acrylic resin with the same thickness as that of the body aforesaid mounted within the opening and on the flange of the supporting ring, a reinforcing ring fabricated of woven material impregnated with and surrounded by acrylic resin integrally imbedded in the edge portion of one surface of the plate, and means coacting with the reinforcing ring, the edge portion of the door and said flange for removably securing the door within the access opening with its surfaces coextensive with the surrounding surfaces of the body.

5. A door having a local reinforced area comprising a plate of acrylic resin having a recess or cavity in the edge portion of one of its faces and a reinforcing ring fabricated of woven cloth impregnated with and surrounded by acrylic resin arranged to completely fill said recess or cavity and have its inner surfaces integrally united with the walls of said recess or cavity and its outer surface forming a coplanar continuation of the corresponding surface of the plate.

6. A door comprising a plate of acrylic resin having a recess or cavity in the edge portion of one of its faces, the bottom thereof being parallel to the faces of the plate and the inner wall thereof connecting said bottom with one face of the plate being angularly disposed relative to both the bottom and one face of the plate, and a reinforcing ring consisting of woven material laminated with and surrounded by acrylic resin having its opposed surfaces parallel one to the other and a thickness equal to the depth of the recess or cavity whereby its outer edge aligns with the edge of the plate and its outer surface constitutes a flush continuation of the adjacent surface of the plate, the inner edge of said ring being disposed at an angle to both of its surfaces to rest in flush abutment with the sloping inner wall of the recess or cavity, the resin of the ring and the resin of the plate being united integrally with the plate at all abutting surfaces.

7. A structural aircraft component fabricated of acrylic resin and having an access opening therein, in combination with a supporting member carried by the lip of said opening, said supporting member comprising one or more layers of woven fabric impregnated with and surrounded by acrylic resin formed with a mounting section positioned over and integrally united with one surface of the component adjacent the lip of the opening, and a free extension of said mounting section projecting into and circumscribing the opening.

8. The combination with an aircraft component formed of synthetic resin having an access opening therein, of a door for said access opening comprising a plate of synthetic resin having the same thickness as that of the component, localized reinforced areas provided in conjunction with both the component and the door, the reinforced area of the component having an integral, reinforced extension circumscribing said opening adjacent one face of the component, and means coacting with said extension and the reinforced area of the door for removably securing the latter to said extension with its opposed surfaces coextensive with the corresponding surfaces of the component.

9. An aircraft canopy formed of acrylic resin and having an access opening therein, a door for said opening formed of acrylic resin having a thickness substantially equal to that of the canopy, an integral portion of the canopy adjacent and surrounding the access opening being reinforced with wire cloth embedded in acrylic resin and the edge portion of the door being integrally reinforced by imbedded wire cloth, a reinforced flange integral with the reinforced portion of the canopy and projecting over said opening, and means associated with the same flange and the edge portion of the door to removably secure the latter to the flange.

10. An aircraft canopy formed of acrylic resin having an access opening therein, a reinforcement of woven wire imbedded in acrylic resin integral with the edge portion of the canopy defining the access opening, an integral extension of said reinforcement projecting over and circumscribing said access opening, a door comprising a plate of acrylic resin having substantially the same thickness as the resin of the canopy, a reinforcement of woven wire imbedded in acrylic resin integrally associated with the edge portion of the plate, and means coacting with the edge portion of the door to removably attach it to the extension aforesaid with its opposed surfaces forming flush continuations of the surrounding surfaces of the canopy.

11. An aircraft canopy formed of acrylic resin having an access opening therein, a reinforcement of woven wire imbedded in acrylic resin integral with the edge portion of the canopy defining the access opening, an integral extension of said reinforcement projecting over and circumscribing said access opening, a door comprising a plate of acrylic resin having substantially the same thickness as the resin of the canopy, a reinforcement of woven wire imbedded in acrylic resin integrally associated with and confined within the limits of the plate, and attaching means piercing the reinforced edge portion of the plate and said extension to removably secure the plate to the extension with its opposed surfaces forming unbroken continuations of the corresponding surrounding surfaces of the canopy.

12. In combination with a body formed of synthetic resin and having an access opening therein, of a unitary supporting ring associated with the lip of the opening consisting of a mounting section arranged to overlie and be integrally united with the surface of the body adjacent said opening and a flange carried by the mounting section to project into and circumscribe said opening, said supporting ring being fabricated of woven material impregnated with and surrounded by synthetic resin, a door to be removably positioned within said opening and supported by said flange with its surfaces coextensive with the surrounding surfaces of the body, consisting of a plate of synthetic resin, a reinforcing ring fabricated of woven material impregnated with and surrounded by synthetic resin integrally imbedded in the edge portion of the outer surface of the plate, and attaching means coacting with the reinforcing ring, the edge portion of the door and the flange to removably secure the door to the flange.

EDWARD H. VOELKER.

REFERENCES CITED

The following references are of record in the file of this patent:

UNITED STATES PATENTS

| Number | Name | Date |
|---|---|---|
| 2,322,582 | Marini | June 23, 1943 |
| 2,403,061 | Dounes | July 2, 1946 |
| 2,473,616 | Stephenson | June 21, 1949 |
| 2,511,168 | Martin et al. | June 13, 1950 |